United States Patent Office 3,505,595
Patented Apr. 7, 1970

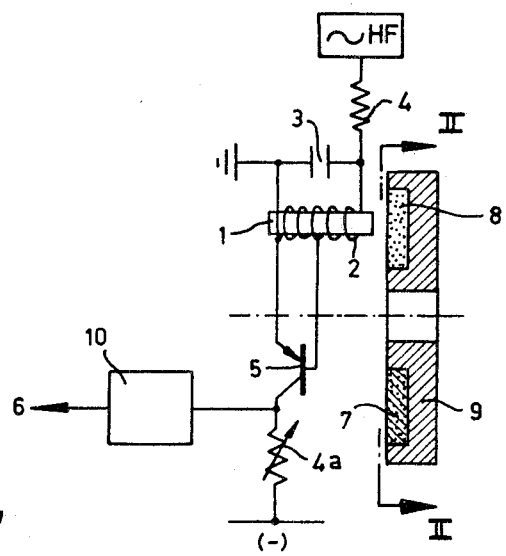
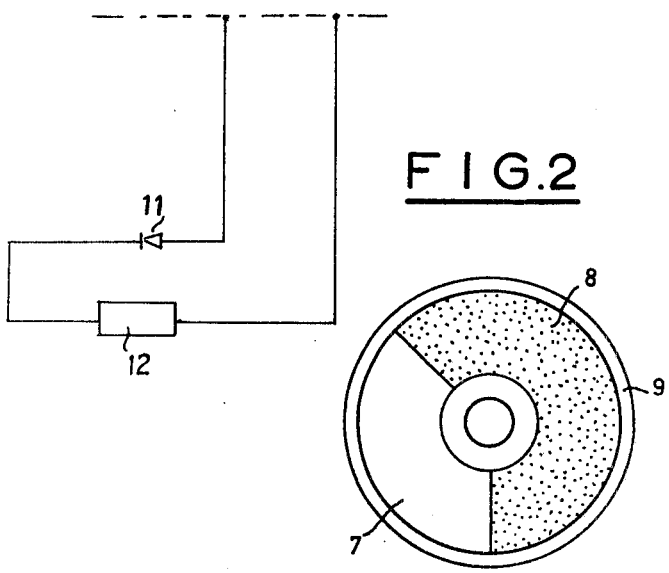

3,505,595
ROTATIONAL SPEED SENSOR UTILIZING THE PHASE SHIFT CAUSED BY SUPERPOSITION OF AN A.C. SIGNAL IN THE SENSOR AND A SIGNAL INDUCED FROM THE ROTATING BODY
Robert Favre, 36 Servan, Lausanne, Switzerland
Continuation-in-part of application Ser. No. 430,525, Feb. 5, 1965. This application Oct. 20, 1966, Ser. No. 588,121
Int. Cl. G01p 3/44
U.S. Cl. 324—70
3 Claims

ABSTRACT OF THE DISCLOSURE

A rotational speed sensing circuit is disclosed. A disc having a magnetic sector induces a voltage in an inductance having a permeable core. The inductance is tuned to the frequency of an exciter oscillator coupled thereto. The resultant phase shift between the oscillator voltage and that of the induced voltage is proportional to the rotation of said disc.

This application is a continuation-in-part of my previous application Ser. No. 430,525, filed on Feb. 5, 1965, and now abandoned.

Various devices are known for detecting, or sensing, the displacement of moving bodies, in particular devices for controlling moving bodies having a rotary motion. Some of such devices, e.g., inductive detectors can work only when the body is actually in motion, whereas other more widely used devices can detect the position of a body even when the latter is motionless.

The devices adapted to the determination of the angular position of a given moving body usually comprise a member which is driven jointly with said moving body, and having a discontinuity permitting the device proper to be energized. Said member is often a disc provided with an opening which permits to pick up a signal through a photoelectric-, magnetic, capacitive-, radio-active effect, or else by HF coupling. However, such a discontinuity causes an unbalance, which is a source of trouble at high velocities.

The object of the present invention is a device for producing an A.C. voltage phase shifted in proportion to the velocity of a moving body. This device comprises at least one saturable induction coil, magnetic means for submitting said coil to a saturation which varies according as said moving body is located or not near it, a resonance circuit responsive to the saturation of said coil and adapted to send a voltage to a phase discriminator whenever the saturation state corresponds to the presence of the moving body in said region of its trajector.

The features of the present invention will be disclosed hereafter, reference being had to the accompanying drawing, in which:

FIGURE 1 is a diagrammatic representation of one embodiment of the device of the invention;

FIGURE 2 is a section of FIGURE 1 along axis II—II;

Figure 3:
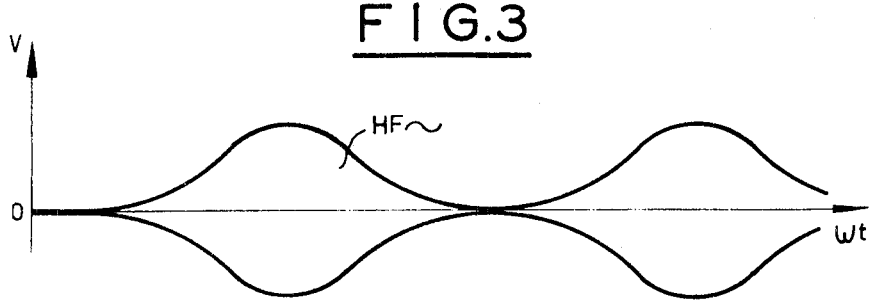
FIGURE 3 is a graph the curves of which show the resonance oscillation with general form independent of the angular speed of a rotor.
Figure 4:
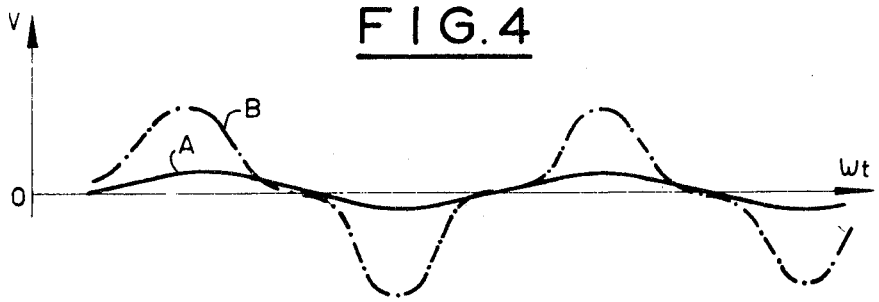
Figure 5:
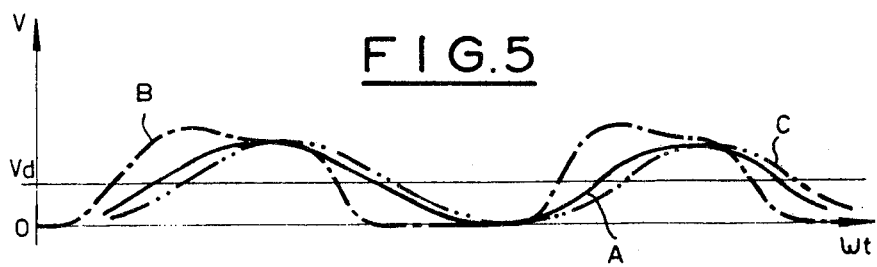
Figure 6:
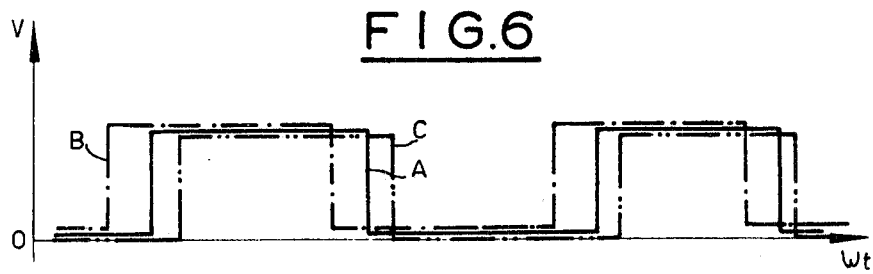

FIGURE 4 is a graph the curves of which represent the voltage induced in the coil by the variation of the magnetic polarising flux, the amplitude being proportional to the rotor velocity and the ratio $A/B$=slow velocity/fast velocity. FIGURE 5 is a graph showing the resultant voltage after superimposition of the voltages of FIGURES 3 and 4 and with respect to the threshold voltage ($Vd$). FIGURE 6 is the discriminated curve. FIGURE 7 is the same as FIGURE 1 for another embodiment.

The device shown comprises a ferrite core 1 and a coil 2 forming a resonant circuit with a capacitor 3. This circuit is energized by a HF current which is applied across a resistor 4. Coil 2 is provided with a tap lead to which is connected the base-electrode of a transistor 5, the emitter-electrode of which is connected to the left-hand (as viewed in the drawing) extremity of said coil; the collector-electrode of transistor 5, the voltage of which is adjusted by a variable resistor 4a, is connected by means of a lead 6 to a phase discriminator 10, such as a flip-flop circuit or monostable multivibrator which gives an output whenever the input thereto exceeds the threshold value set. If the saturable induction coil is put in resonance, in the absence of an outer magnetic field, transistor 5 will be in the conductive state so that a fairly strong current flows through.

The application of a sufficient outer magnetic field to the bar 1 is sufficient for shifting the frequency well beyond the resonance frequency, so that no current can flow in line 6.

In the form of embodiment as shown, the device is applied to the detection of the passage of a circular sector of a moving body in front of a reference point constituted by bar 1.

Considering the resonance circuit composed of capacitor 3, core 1, coil 2, only if a feed voltage at 4 is equal to the natural frequency of this circuit or is a multiple thereof, will the circuit resonate and furnish a signal voltage.

For other values, this circuit will function as a blocking circuit.

In FIGURE 1, the capacitance and the conductance are constant. Thus the voltage frequency which depends upon these two factors, in accord with a well known formula can thus be varied here only by the approach and withdrawal of the magnetic disc 9 from the core. The effect of this magnet is equivalent to varying the conductance. Whenever the magnetisation of the core is changed, its inductance is changed. While the disc makes one revolution, it changes the inductance from a minimum to a maximum. Whenever the magnetised rotor is not sufficiently close to the core, the resonance frequency of the circuit is at its natural frequency and will furnish an output voltage. However, the external magnetism furnished of the oscillating circuit, disturbing its natural frequency, there is no output. Translated in terms of the number of degrees between the position of fixed coil 2 and the magnet on the rotating disc (P) at P=180° the influence of the magnet on the core is zero and the output of the circuit is at its maximum (or natural frequency). This can be seen from an examination of FIGURE 4 where positive voltages result from the magnet approaching the coil and the amplitude is proportional to the speed of rotation of disc.

Considering the curves of FIGURE 5, the coil will be most magnetised (up to its saturation value) when angle P is O. When the magnet approaches the coil, not only is the conductance changed but a voltage will be induced in the coil in accord with the relation $d(\text{flux}) = V/dT$. Curve A represents the voltage produced at high speed. Curve B the voltage at low speed and C at very low speed. The curves of FIGURE 5 are the result of the superimposition of the detected voltage curves independently of the speed of rotation of the disc superimposed on the curves of FIGURE 4 which are voltage curves for the voltage induced in the coil by the variation of the magnetic polarising flux relative to the threshold voltage of monostable multivibrator 10 and with the negative halves of the curves cut off by a transistor 5 operating like a diode.

FIGURE 6 is the discriminated voltage form corresponding to FIGURE 5 as it issues from 10 and shows the dephasing of the voltage as a function of the speed of rotation of the magnetised rotor. This shift of phase of output of the monostable multivibrator is relative to the momentary angular position of the rotating disc or change of voltage value at a given time relative to another time.

It is seen that the threshold value is reached first at a very high speed (A) of the disc, next at low speed and last by rotation at very low speed (C).

The moving body is provided with a rotor or disc 7, shown in plan view in FIGURE 2, made of a substance having a high coercive field and axially magnetisable. The sector 8 is magnetised whereas the remainder of the disc is not. This disc 7 is inserted into a ferromagnetic support 9 forming an armature which partially closes the magnetic circuit in order to avoid the demagnetization of sector 8.

When magnetized sector 8 passes in front of bar 1, no output signal occurs in line 6, whereas a signal is produced whenever bar 1 comes in register with the non-magnetized region.

Disc 7 and its support 9 should be exactly balanced with respect to their axis of revolution, where the device is to be rotated at very high speeds.

The manufacture and the mounting of the disc are easy due to the fact that the detection elements are on the same side with respect to said disc.

Quite obviously, according to a modified form of embodiment (not shown) disc 7 and its support 9 could be stationary, and the detection elements rotatively driven with respect to said disc.

The above-described device can be used to control the ignition of internal combustion engines by electronic means, with a view to providing the ignition lead as a function of velocity, by combining the detection voltage and the voltage induced by rotation. This is so since the movement of spark ignition must be earlier as the engine turns faster.

This in practice can be effected by connecting the output of 10 to the ignition system of the engine.

The present device can be used in an electric commutation motor to make up for the time lag inherent in the windings and other part of the control circuit of such a motor by ensuring that electric impulses are generated earlier.

To recapitulate, the "dephasing" provided by the present device is relative to a given angular position of its magnet. Thus whenever the magnet passes a given angular position which for example, corresponds to the magnet and coil being in register, for a maximum voltage, this voltage is dephased in proportion to the velocity of the magnet relative to the idealized resonance voltage shown in FIGURE 3 (with the induction voltage components subtracted, i.e., with the magnet moving so slowly that practically no induced voltage arises). In FIGURE 5, it can be seen that the extremes of the resonance voltage curve after adding the amplitudes of the two curves are dephased more to the left relative to the resonance value as the speed of the magnet increases.

It should be noted that where in FIGURE 1, member 10 is a discriminator such as a monostable multivibrator the output as shown on FIGURE 6 is a square voltage curve. However, the waveform of FIGURE 5 can be used, since the maximas are already dephased, to, for example, feed the windings of an electrically commutated motor. Element 10 can also be the load to be controlled such as the motor winding, if no further amplification of the output is needed. This element can also be a known amplifier for amplifying the wave form shown on FIGURE 5.

As appears on FIGURE 1, element 10 can be a diode. In that circuit the diode would have for its only function to define a given threshold voltage.

In the circuit diagram of FIGURE 7 are shown a diode 11 and a load 12 connected in series so that the tappings of the inductance (i.e., 1 of FIG. 1) are directly connected to the circuit of the load to be controlled and which is to be energised in only one direction. It can be seen from FIG. 7 that it is possible to remove the transistor and to place the diode in series with the load which is itself connected to the coil, without amplification means.

I claim:

1. A circuit for sensing the rotational speed of a disc having a sector of axially magnetized material and another sector of a nonmagnetized substance comprising a tuned circuit including a winding forming an inductance, a capacitance in parallel therewith, said winding having a ferromagnetic core, an exciter generator connected to said circuit supplying a voltage at the resonant frequency thereof, said disc being so placed with respect to said core as to provide magnetic coupling between said magnetized sector and said core when the two are axially aligned during rotation of said disc, thereby inducing a voltage in said winding during rotation, said induced voltage being superimposed upon said resonant frequency voltage producing a phase shift therebetween, the extent of said shift being proportional to the speed of rotation of said disc, and means for monitoring said phase shift as an indication of the speed of said disc.

2. Apparatus in accordance with claim 1 wherein said resonant frequency voltage supplied to said tuned circuit is of a magnitude effecting near saturation of said ferromagnetic core.

3. Apparatus in accordance with claim 1 wherein a portion of said winding is connected between the base and emitter of a transistor the collector circuit thereof having a variable load resistance for adjustment of the voltage output.

References Cited

UNITED STATES PATENTS

| 2,532,231 | 11/1950 | Jarvis | 324—41 |
| 2,875,429 | 2/1959 | Quade | 324—41 |
| 2,948,852 | 8/1960 | Bacon. | |
| 3,395,341 | 7/1968 | Malaquin. | |

R. V. ROLINEC, Primary Examiner

R. J. CORCORAN, Assistant Examiner

U.S. Cl. X.R.

340—263; 246—249